April 25, 1950  R. E. WISSMAN  2,505,600
COMBINATION BRAKE AND CLUTCH UNIT
Filed Jan. 26, 1948  2 Sheets-Sheet 2
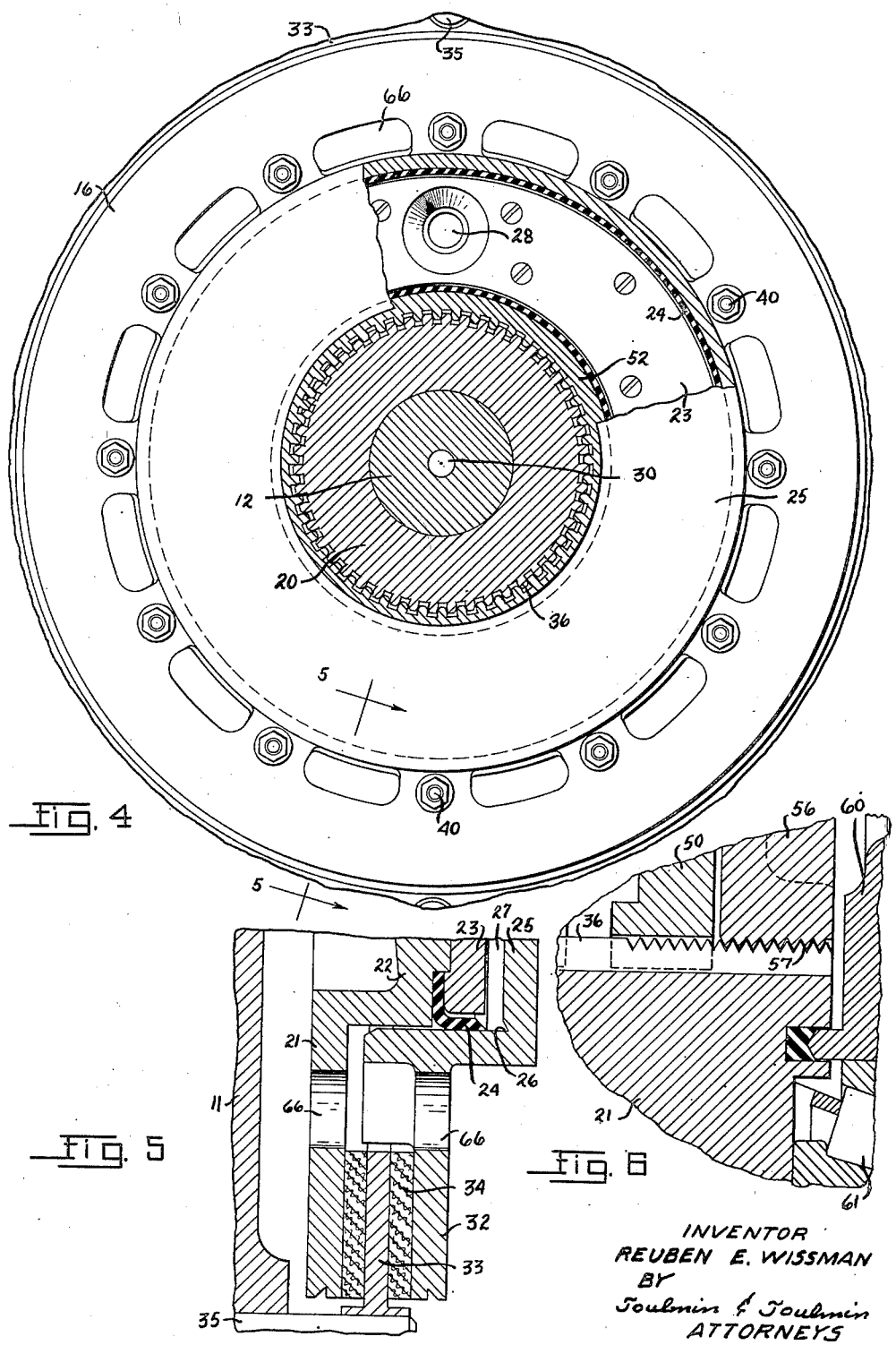
INVENTOR
REUBEN E. WISSMAN
BY
Toulmin & Toulmin
ATTORNEYS Patented Apr. 25, 1950

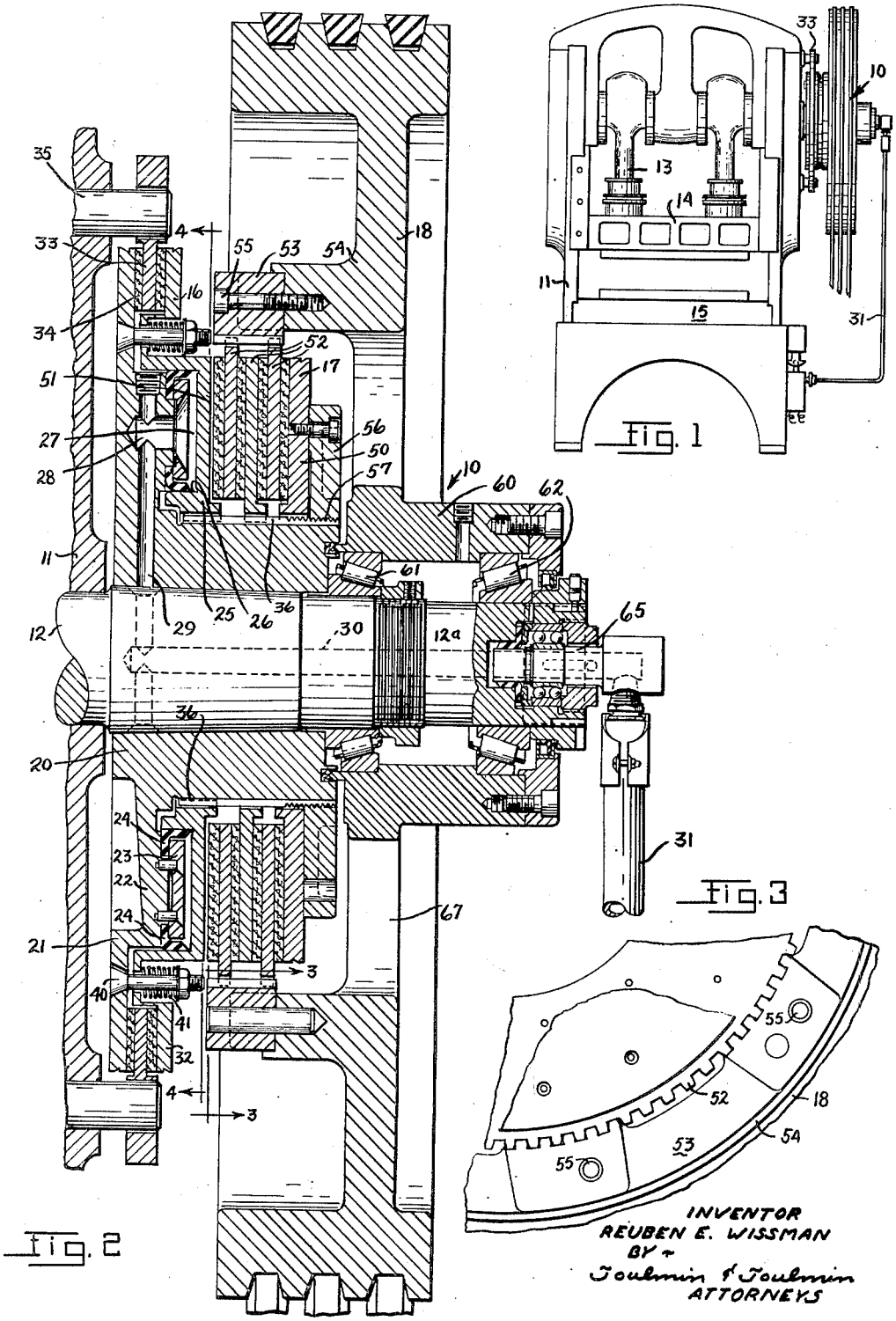

2,505,600

UNITED STATES PATENT OFFICE 2,505,600

COMBINATION BRAKE AND CLUTCH UNIT

Reuben E. Wissman, Minster, Ohio, assignor to The Minster Machine Company, Minster, Ohio, a corporation of Ohio Application January 26, 1948, Serial No. 4,390

2 Claims. (Cl. 192—18)

This invention relates to a combination clutch and brake structure that is adapted to be placed on the drive shaft of a mechanical press, and is associated with the flywheel of the press and connected thereto, the clutch and brake structure permitting intermittent starting and stopping of the mechanical press.

It is well known that the flywheel and a clutch and brake structure for cooperation therewith that is mounted on the drive shaft of a mechanical press involves substantial weight which tends to deflect the extending drive shaft unless an outboard bearing is provided for the shaft. In my copending application, Serial No. 582,296, now abandoned, I have disclosed an improved brake and clutch construction that is associated with a flywheel of a mechanical press which greatly reduces the amount of overhang required for a drive shaft to mount the elements of the brake, the clutch and the flywheel. The construction has therefore eliminated the necessity of using an outboard bearing to support the projecting end of the drive shaft.

Further, the construction of the combined brake and clutch of my copending application provides a mechanism by which extremely rapid operation of the brake and clutch is obtained, thus greatly increasing the speed of operation of a mechanical press on which the apparatus is installed.

The clutch and brake structure of this invention is an improvement over that previously disclosed by me for obtaining even greater speed of operation of a mechanical press than has heretofore been considered possible. Also, it is a purpose of this invention to increase the work capacity of the clutch and brake structure without making any substantial increase in the size of the apparatus and the amount of overhang required of the drive shaft to support the apparatus and a flywheel associated with it.

It is thus an object of this invention to provide an improved combination brake, clutch and flywheel structure that can be mounted as a unit upon an overhanging shaft that extends from the frame of a press in which the clutch unit is largely contained within the flywheel and the brake unit is of longer diameter than the clutch unit and is positioned between the flywheel and the press, a common actuating member being disposed between the brake and the clutch for alternate operation of the units.

Still another object of the invention is to provide an apparatus of the kind referred to in the foregoing object wherein the clutch unit consists of a multiple disc clutch.

Still another object of the invention is to provide an apparatus of the kind set forth in the foregoing objects wherein the power means for operating the clutch unit is aligned with the operating discs of the clutch unit so that full effect of the power source is applied to the clutch discs normal thereto and in alignment therewith to avoid any bending moment in the clutch discs and thereby obtain greater accuracy of control of operation of the clutch.

Still another object of the invention is to provide an apparatus according to the foregoing object wherein the brake unit that is associated with the clutch unit also has the force applied to the brake unit by means that is in alignment with the braking surfaces to obtain greater accuracy of control of operation of the brake.

Still another object of the invention is to provide a clutch unit in an apparatus of the kind disclosed in this invention wherein the clutch consists of a plurality of discs that are compressed together by an annular actuating member which is of substantially the same size as the clutch discs so that full power of the actuating member can be applied to the clutch discs.

Another object of the invention is to provide a combination clutch and brake unit wherein there is provided a common member for actuating the clutch and brake units alternately, and further to arrange resilient members forming a piston of a pneumatic motor within the common actuating member in such a manner that the resilient members will not be overheated, and thereby increase the life of the resilient piston members.

Further objects and advantages will become apparent from the drawings and the following description.

In the drawings:

Figure 1 is a front view of a mechanical press incorporating the apparatus of this invention.

Figure 2 is a vertical cross-sectional view through the combination brake, clutch and flywheel structure of this invention.

Figure 3 is an elevational view of a part of a clutch structure and is taken substantially along line 3—3 of Figure 2.

Figure 4 is a transverse cross-sectional view of the apparatus taken along line 4—4 of Figure 2.

Figure 5 is a cross-sectional view of a part of the brake of the apparatus taken along line 5—5 of Figure 4.

Figure 6 is a cross-sectional view of a portion of the clutch illustrating the manner of adjustment for the clutch and brake unit to regulate the amount of movement required to effect alternate operation of the clutch and brake.

In this invention the combination brake, clutch and flywheel structure is indicated generally by the reference numeral 10 and may be applied to the drive shaft of a mechanical press, as illustrated in Figure 1.

The mechanical press consists of a frame 11 having a crankshaft 12 that may carry a pair of connecting rods 13 suitably mounted upon the cranks on the drive-shaft 12. The connecting rods 13 are attached to a platen 14 for moving it toward and away from the bed 15 of the press.

The crankshaft or drive-shaft 12 overhangs the frame 11 of the press, as illustrated in Figure 2. The combination clutch, brake and the flywheel structure 10 is adapted to be carried completely on the overhanging part 12a of the drive-shaft 12, the width of the structure being such that only a short overhanging shaft is required to support all three elements, thus eliminating the necessity of an outboard bearing for the drive-shaft 12.

The drive-shaft 12 thus carries the brake 16, the clutch 17 and the flywheel 18, all of which may be readily removed from the end of the drive-shaft 12.

The brake and clutch mechanism consists of a sleeve 20 that has a radial flange 21 extending from one end thereof. This radial flange 21 has an annular ridge 22 on one side thereof which carries an annular ring 23 that secures to the ridge 22 a pair of annular angle-shaped resilient members 24 that form the piston of a pneumatic motor. The cylinder of the pneumatic motor consists of an annularly-shaped member 25 that is splined upon the sleeve 20 by longitudinal splines 36 arranged between the member 25 and the sleeve 20. These splines 36 may take the form of gear-teeth, as shown in Figure 4.

The member 25 has an annular recess 26 in which it receives the resilient members 24, thereby forming an air chamber 27. Air is delivered into the chamber 27 through the passages 28 and 29 that connect with an axial passage 30 in the drive-shaft 12. The passage 30 is supplied with air from an outside source through a supply conduit 31.

The radial disc 21 provides near its outer periphery a braking surface as part of a disc-type brake of the brake 16. Thus, the radial flange 21 provides a brake-plate that is carried with the shaft 12 upon rotation thereof.

The annularly-shaped pressure cylinder 25 has a radial flange 32 that forms a rotating brake-ring of the brake 16.

Between the rotating brake-ring 16 and the rotating brake-plate 21 there is placed a stationary brake-ring 33 which carries brake facings 34 on opposite faces thereof to be engaged by the brake plate 21 and the brake-ring 32.

The stationary brake-ring is carried upon pins 35 that extend from the frame 11 of the press, the brake-ring 33 being slidable upon the pins 35 to allow freedom of axial movement of the brake-ring 33.

Pins 40 extend from the brake plate through the rotating brake-ring 32 and are surrounded by the compression springs 41 which cause the brake-ring 32 to be moved toward the brake-plate 21 and thereby engage upon the brake-ring 33.

The clutch 17 consists of a clutch plate 50 that is splined upon the sleeve 20 through the splines 36. The opposite clutch plate is formed by the annular cylinder 25, it being provided with a radial face 51 that is parallel to the clutch plate 50. Between the clutch plate 50 and the annular cylinder 25 there is provided a plurality of clutch discs 52, one of which is splined on the splines 36 and others of which are splined to a ring 53 that is secured to the web 54 of the flywheel 18 by means of bolts or cap-screws 55.

The clutch plate 50 is movable toward the brake plate 21 when the adjusting ring 56 which is carried on the threaded portion 57 of the splined sleeve 20 is rotated. This adjusting plate 56 thus provides for controlling the degree of movement required by the annular cylinder 25 in alternately engaging the brake 16 and the clutch 17.

The flywheel 18 has the hub 60 which is supported upon the primary roller bearing 61 carried on the drive-shaft 12. A secondary roller bearing 62 is positioned between the hub 60 and the drive-shaft 12 to provide stability of mounting of the flywheel 18 on the outboard end of the drive-shaft 12.

The air conducting line 31 is connected to the axial passage 30 in the drive-shaft 12 through means of a suitable connection 65 which allows rotation of the drive-shaft relative to the connecting portion of the conduit 31.

To provide for cooling of the brake 16, and to prevent any substantial conduction of heat from the brake 16 to the clutch 17, the annular flange 21 or brake plate is provided with a series of openings 66 which allows air to circulate around the disc brake 16. Air circulation is also provided around the clutch 17 since the flywheel 18 is provided with openings 67 in the web 54.

As previously described, the annular angle-shaped resilient members 24 that are secured to the radial flange 21 form the piston element of an annularly shaped pneumatic motor, the recess 26 in the member 25 forming the cylinder of the pneumatic motor in which the piston elements 24 are positioned. The annular ring 23 secures the piston members 24 to the radial flange 21.

The member 25 forms a common actuating member between the brake 16 and the clutch 17. Therefore, it will be apparent that considerable frictional heat will be absorbed by the member 25 due to continued alternate engagement of either the outer or central portions of the member, brake and clutch respectively.

To avoid excess heat being absorbed by the resilient members 24 that form the piston of the pneumatic motor, they are mounted on the radial flange 21, which is a member that remains substantially cooler than the member 25. While the edges of the members 24 do engage the member 25, yet the mass of the ring 23 which secures the members 24 to the radial flange 21 is out of engagement with the relatively hot member 25 and therefore the amount of heat which can be transmitted into the resilient members 24 is substantially reduced.

Further, due to the fact that the clutch and brake are operated alternately, and at relatively high speeds, there is a substantial flow of air through the pneumatic chamber 27. Therefore, the ring 23 is continuously cooled by the movement of air through the chamber 27 and thus tends to cool the resilient members 24. The effect of the construction is that the working life of the resilient members 24 is substantially increased because they are not deteriorated by the effect of high temperature.

While the apparatus disclosed and described herein constitutes a preferred form of the invention, yet it will be understood that the apparatus is capable of modification without departing from the spirit of the invention, and that all such modifications are intended to be included in the appended claims.

Having thus fully described my invention, what I claim as new and desire to secure by Letters Patent is:

1. A combination clutch and brake unit including, a clutch consisting of a plurality of annular clutch discs, an annular power unit adjacent said clutch and consisting of a member axially stationary relative to said clutch and a member axially movable relative to said clutch, said movable member engaging at least one of said clutch discs for actuation of said clutch, resilient seal means between said stationary and movable members carried exclusively on said stationary member and secured thereto only, said stationary and movable members each having a radial extension forming brake plates, a brake ring between said brake plates and stationary relative to the same, air passage means in said radial extensions between the portions thereof forming the brake plate elements and said power unit to provide for air circulation through said radial extensions and reduce heat conduction from said brake plates to said seal means, spring means urging said movable member toward said stationary member to cause release of said clutch and engagement of said brake, and conduit means connected with said power unit for conducting fluid under pressure thereto to cause reverse action of the clutch and brake.

2. A combination clutch and brake unit including, a clutch consisting of a plurality of annular clutch discs, an annular power unit adjacent said clutch and consisting of a member axially stationary relative to said clutch and a member axially movable relative to said clutch, said members each having a radial extension forming brake plates, a brake ring between said brake plates nonrotatable relative to the same, said movable member forming a common actuating member engaging said clutch and said brake and having a chamber therein forming a cylinder portion of the power unit, resilient seal means carried exclusively on said stationary member and secured thereto only and forming a piston slidably cooperating with said chamber to provide a fluid chamber between said stationary member and said movable member, said radial extensions of said stationary and movable members having openings therein between the brake plate forming portions and the chamber forming portions to provide for circulation of air through said extensions and reduce heat conduction from said brake plates to said seal means, spring means engaging said movable member for actuating the same to release said clutch and engage said brake, and conduit means connected with said chamber of said power unit for conducting fluid under pressure thereto to cause reverse action of the clutch and brake.

REUBEN E. WISSMAN.

REFERENCES CITED

The following references are of record in the file of this patent:

UNITED STATES PATENTS

| Number | Name | Date |
|---|---|---|
| 1,515,401 | Norris | Nov. 11, 1924 |
| 2,095,094 | Glasner | Oct. 5, 1937 |
| 2,180,218 | Wisman | Nov. 14, 1939 |

FOREIGN PATENTS

| Number | Country | Date |
|---|---|---|
| 525,124 | Great Britain | of 1940 |